United States Patent [19]

Wenz, Jr.

[11] Patent Number: 4,731,004
[45] Date of Patent: Mar. 15, 1988

[54] SIDE-BY-SIDE CO-EXTRUSION OF FILM USING MULTIPLE MATERIALS

[75] Inventor: Herbert J. Wenz, Jr., Garland, Tex.

[73] Assignee: Princeton Packaging, Inc., Greenwich, Conn.

[21] Appl. No.: 785,348

[22] Filed: Oct. 7, 1985

Related U.S. Application Data

[63] Continuation-in-part of Ser. No. 660,222, Oct. 12, 1984, abandoned.

[51] Int. Cl.$^4$ .................. B29C 47/10; B29C 47/14; B29C 47/92
[52] U.S. Cl. .................. 425/133.5; 425/462
[58] Field of Search .................. 425/133.5, 461, 462

[56] References Cited

U.S. PATENT DOCUMENTS

| | | | |
|---|---|---|---|
| 3,223,761 | 12/1965 | Raley | 264/515 |
| 3,318,988 | 5/1967 | McDowell | 264/171 |
| 3,321,804 | 5/1967 | Breidt, Jr. et al. | 425/133.5 |
| 3,397,428 | 8/1968 | Donald | 425/133.5 |
| 3,398,431 | 8/1968 | Corbett | 425/133.5 |
| 3,547,754 | 12/1970 | Tokos et al. | 428/220 |
| 3,557,265 | 12/1971 | Chisholm et al. | 264/46.1 |
| 3,559,239 | 2/1971 | Work et al. | 425/133.5 |
| 3,565,737 | 2/1971 | LeFevre et al. | 428/60 |
| 3,645,837 | 2/1972 | Chisholm et al. | 428/316.6 |
| 3,708,379 | 1/1973 | Flint | 428/58 |
| 3,743,143 | 7/1973 | Barney et al. | 425/131.1 |
| 3,743,459 | 7/1973 | Schrenk et al. | 425/462 |
| 3,743,460 | 7/1973 | Woolridge | 425/133.5 |
| 3,759,647 | 9/1973 | Shrenk | 425/133.5 |
| 3,837,773 | 9/1974 | Raley | 425/131.1 |
| 3,884,606 | 5/1975 | Schrenk | 425/133.5 |
| 3,918,865 | 11/1975 | Nissel | 425/131.1 |
| 4,100,237 | 7/1978 | Wiley | 425/40.6 |
| 4,272,312 | 6/1981 | Thompson | 264/145 |
| 4,289,560 | 9/1981 | Simons | 264/177.16 |
| 4,316,868 | 2/1982 | Esposito et al. | 264/171 |
| 4,476,075 | 10/1984 | Brinkmann et al. | 264/40.7 |
| 4,476,080 | 10/1984 | Komoda et al. | 425/133.5 |
| 4,515,647 | 5/1985 | Behr | 425/131.1 |
| 4,521,359 | 6/1985 | Tsien | 425/133.5 |
| 4,526,528 | 7/1985 | Kline et al. | 425/133.5 |
| 4,533,510 | 8/1985 | Nissel | 264/171 |
| 4,556,376 | 12/1985 | Sievers et al. | 425/131.1 |
| 4,562,023 | 12/1985 | Pabst et al. | 425/133.5 |
| 4,600,550 | 7/1986 | Clören | 425/462 |
| 4,619,802 | 10/1986 | Clören | 425/131.1 |

FOREIGN PATENT DOCUMENTS 1264744 3/1968 Fed. Rep. of Germany.

OTHER PUBLICATIONS

Patent Cooperation Treaty International Search Report, PCT US/85/02007.

*Primary Examiner*—Willard E. Hoag
*Attorney, Agent, or Firm*—Richards, Harris, Medlock & Andrews

[57] ABSTRACT

A film of uniform thickness is formed by two or more materials (A, B, etc.) extruded side-by-side with their common edge joined and co-mingled to form a single piece film. The film is preferably formed in a conventional slot die by use of a barrier dividing the entry manifold into two passages so that the materials co-mingle downstream of the barrier at their common edge. In one application, the film can be extruded partially clear and partially opaque to form a bread wrapper.

13 Claims, 16 Drawing Figures

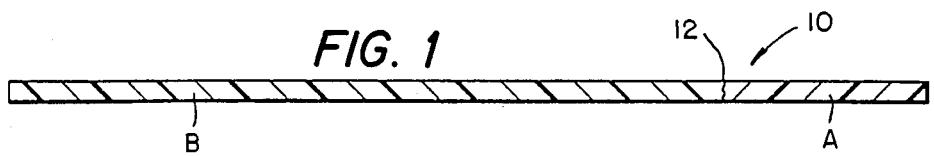
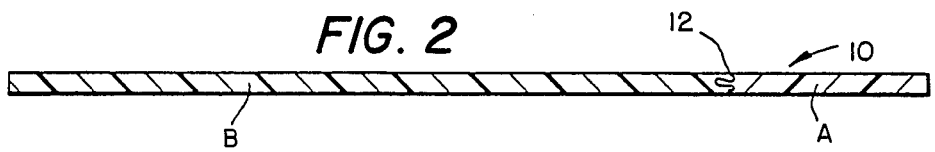
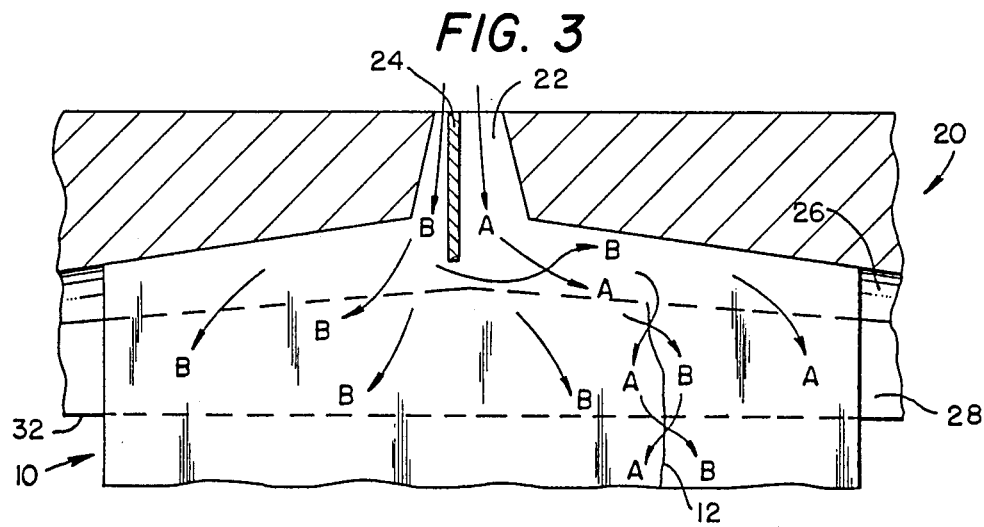
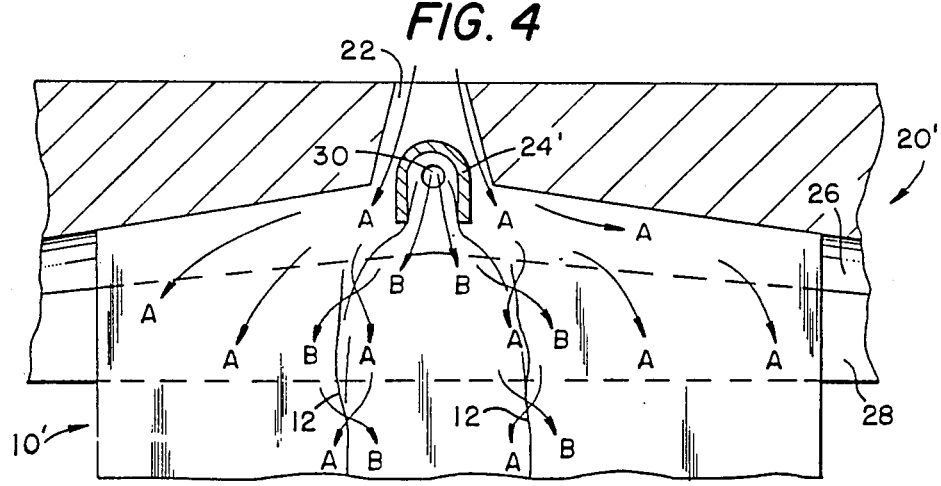

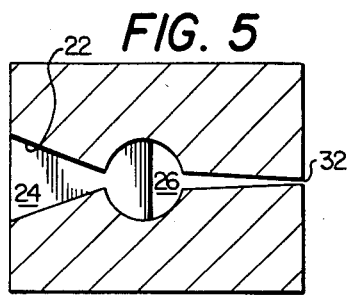
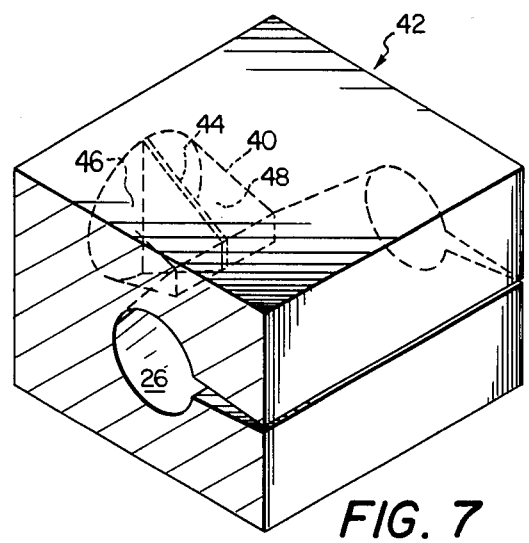
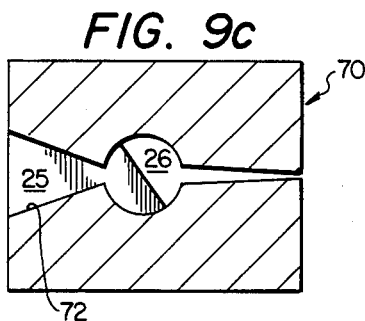
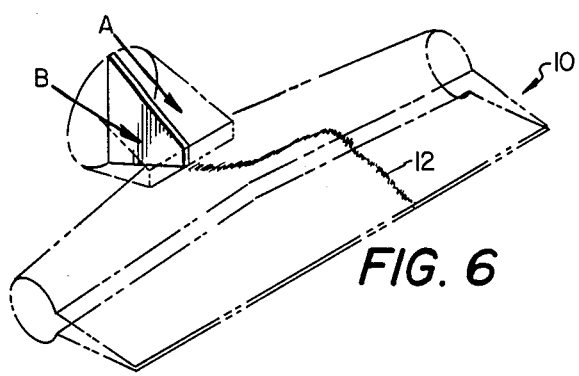
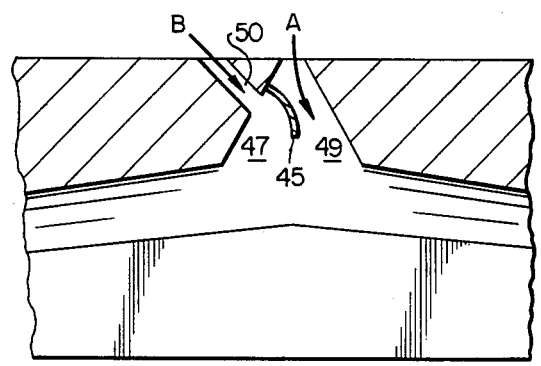

SIDE-BY-SIDE CO-EXTRUSION OF FILM USING MULTIPLE MATERIALS

CROSS REFERENCE TO RELATED APPLICATIONS

This application is a continuation-in-part of application Ser. No. 660,222, filed Oct. 12, 1984, now abandoned.

TECHNICAL FIELD

This invention relates to an extruded thermoplastic film formed from two or more materials extruded and joined side-by-side across the width of the film. The film can be used for a variety of purposes, including wrapping or packaging. One particular application is for packaging bread.

PRIOR ART

Extrusion of thermoplastic materials to form thin films is a common process. A thermoplastic material is plasticized, i.e., formed into a flowable molten state, within an extruder. A stream of the molten material is then fed into a special die, such as a slot cast process extrusion die, where the molten material is formed into a very thin film. The still molten material is typically drawn down from the die in film form and chilled on a chill roll to form the finished film product.

As the extrusion industry developed, it became apparent that significant advantages could be achieved by forming multi-layered co-extruded films having layers of different materials. U.S. Pat. No. 3,479,425 issued Nov. 18, 1969 to Lefevre, et al. and U.S. Pat. No. 3,557,265 issued on Jan. 19, 1971 to Chisholm, et al. each disclose various techniques for such co-extrusions. However, these co-extrusions are limited to forming multi-layered films with each layer of material extending across the entire width of the film. The films produced by these devices therefore have uniform properties across the width of the film.

Normally, in a co-extrusion process such as shown in the prior patents, two or more polymer melts are combined within a feed block, which then supplies the actual die with a multi-layered stream of molten material to be formed into the multi-layered film. In the conventional slot cast process extrusion die, the flow of molten material, already layered, enters the die in an entry manifold connected to the feed block. The material then flows from the entry manifold into a teardrop shaped area, and from there to the die land and lips where it issues from the die as a multi-layered film or sheet. Examples of co-extrusion apparatus, methods and the resulting film structures are also shown in the following U.S. Pat. Nos., all of the disclosures of which are made of record herein: 4,100,237; 3,918,865; 3,645,837; 3,398,431; 3,884,606; 3,547,754; 3,557,265; and 3,223,761.

A significant use of thermoplastic films is the overwrapping of consumer products, such as bread. Frequently, it will be necessary for a portion of the overwrap to be clear so that the consumer can see the actual product and be assured of its freshness and desirability. However, an opaque film is much more suitable for creating a background for a printed graphic for the product. At the present time, various clear thermoplastic films and opaque or colored films are employed for the overwrapping of products. Cellophane is one of the oldest of the clear films employed for this purpose. More recently, various thermoplastic films have been employed successfully for the overwrapping of products such as bread. For example, co-extruded layered films of polyethylene or polypropylene have been employed which maintain the freshness of the product but provide a printable outer surface for the wrapper which can be printed with identifying or advertising indicia. However, by forming such a laminate film structure, which is opaque, the interior of the package, i.e., the bread for example, cannot be examined by the consumer to determine its condition.

SUMMARY OF THE INVENTION

In accordance with the present invention, a segmented thermoplastic film is formed with two or more materials side-by-side across the width of the film by a co-extrusion process, i.e., a portion of the width of the film is formed of one material, for example a clear thermoplastic, while the remaining portion comprises a second material, for example a thermoplastic that is opaque. The common edges of the materials are co-mingled and joined together to form a single uniform thickness film.

In addition to side-by-side co-extrusion of multiple materials, the formed film can be extruded with multiple layers. Also, any number of materials can be co-extruded side-by-side as desired.

The film is formed by a co-extrusion slot cost process utilizing a conventional coat hanger type manifold die having an entry manifold or feed port module modified to permit the inlet of two or more separate melt feeds from two or more extruders. The entry manifold is modified by placing one or more barriers to form at least two separate flow channels opening into the main coat hanger teardrop shaped section of the manifold. By varying the position of the barriers and by controlling the rate of flow of the molten materials, the position of the joined edge across the width of the extruded film can be determined, as can the width of the joint itself, which is determined by the extent of co-mingling between the materials.

In the manufacture of a co-extruded film having a clear material and an opaque material side-by-side, a clear thermoplastic melt would be fed from a first extruder through the entry manifold on one side of the flow barrier, while a second opaque melt feed from a second extruder is fed on the opposite side of the barrier. The barrier can be positioned completely within the entry manifold or extend into the teardrop section of the die. The two materials will flow past the barrier into the tear drop manifold and flow out to the edges of the die, and through the die lips to form a single uniform thickness film with the two separate materials joined along a common edge without a weld line or imperfection in the otherwise uniform transverse thickness of the extrudate where the materials have been intermixed in the teardrop section of the die.

Various entry manifold shapes can be employed. The preferred shape is the fishtail type entry manifold. The fishtail type entry manifold generally has a circular cross section at the beginning of the entry manifold with the cross section changing to an elongated slot configuration where the entry manifold opens into the teardrop section. The initial diameter of the circular opening of the manifold will generally be of equal dimension to the distance between the top and bottom of the teardrop shaped area. Thus, the height of the entry manifold at the elongate slot opening into the teardrop shaped area is substantially less than the distance between the top and bottom of the teardrop shaped area.

Other entry manifold shapes can be used, including a square or cylindrical entry manifold. In the square entry manifold, the cross section of the entry manifold is uniform and of a square or rectangular configuration. The height of the entry manifold corresponds generally to the distance between the bottom and top of the teardrop shaped area. In the cylindrical entry manifold, the cross section through the entry manifold is circular, having a diameter again generally equal to the height between the bottom and top of the teardrop shaped area.

When the present invention employs a fishtail type entry manifold, or any manifold where the height of the entry manifold at the intersection of the entry manifold and teardrop shaped area is substantially less than the distance from the top to bottom of the teardrop shaped area, the barrier generally will not extend into the teardrop shaped area. If little or no overlap or intermix of the flows of the multiple materials is desired in the final film, the barrier is generally extended along the entire length of the entry manifold to the slot opening into the teardrop shaped area. If a greater amount of overlap and intermixing of the flows is desired, the barrier is generally shortened within the fishtail entry manifold so that the flows can intermix prior to reaching the opening into the teardrop shaped area.

In contrast, when using an entry manifold having a square or cylindrical shape, or other entry manifold where the height of the manifold at its interface with the teardrop shaped area approximates the distance between the top and bottom of the teardrop shaped area, it is preferred to extend the barrier into the teardrop shaped area. If little or no overlap or intermix of the flows of the multiple materials is desired in the final film, the barrier for such entry manifolds is extended for a shorter distance into the teardrop shaped area. If a greater overlap or intermix of the flows is desired for such an entry manifold, the barrier is extended further into the teardrop shaped area.

It is important to be able to control the degree of overlap or intermix between the multiple materials. In an environment where a clear material is extruded side by side with an opaque material, this control permits the taper or fade out of the opaque material into the clear material to be precisely determined and uniform along the extruded length of the film. The amount of taper or fade out can thus be set in accordance with the preference of the customers.

The material that is allowed to reach the top and bottom of the teardrop first, normal to the direction of flow, will be the outside material in the overlap area of the final extrudate sheet. If the two flows reach a common point at the top and bottom of the teardrop simultaneously, there will be little or no overlap in the final sheet. By use of a barrier with a downstream end at an oblique angle to the direction of flow of the materials, one material can reach the bottom of the teardrop first while the other can reach the top of the teardrop first. This will result in overlap with the first material exposed on one side and the other material exposed on the other side in the area of overlap.

The width of each of the materials in the final extrudate sheet can also be controlled by varying the flow velocity or volume of each melt feed so that the one with the greater flow will flow around the downstream end of the barrier and push the other material toward the remote side of the die as the materials are co-mingled, prior to their exit from the die. Therefore, the extruded film can have side-by-side materials joining at a common edge with the materials being of different width.

BRIEF DESCRIPTION OF THE DRAWINGS

Further objects and advantages of the invention will become more apparent from the following Description and Claims, and from the accompanying Drawings wherein:

FIG. 1 is a cross-sectional view of the extrudate film forming one embodiment of the present invention;

FIG. 2 is a view similar to FIG. 1 but illustrating where the extrudated film has a greater degree of overlap at the common edge between the two separate materials used to form the film;

FIG. 3 is a cross-sectional schematic representation of the interior of a slot cast process extrusion die with a coat hanger type manifold used to form the extrudate illustrated in FIG. 1;

FIG. 4 is a view similar to FIG. 3, but of slightly modified construction so as to form an extrudate of two different materials with one material forming the center of the final extrudate film and the other material having portions on either side of the first material;

FIG. 5 is a vertical cross-sectional view of the die of FIG. 3 illustrating the entry manifold, teardrop area and die lips;

FIG. 6 is a perspective view of the material flow in the die of FIG. 7 illustrating the co-mingling of multiple materials;

FIG. 7 is a perspective view of an entry manifold having a fishtail configuration with a barrier positioned within the entry manifold to form a co-extrusion with two materials extruded side-by-side;

FIG. 8 is a top view of an entry manifold having a curved barrier within the entry manifold;

FIG. 9c is a partial cross-sectional view of a fishtail shaped entry manifold showing a barrier with a downstream edge formed at an oblique angle to the material flow;

DETAILED DESCRIPTION

Figure 9A:
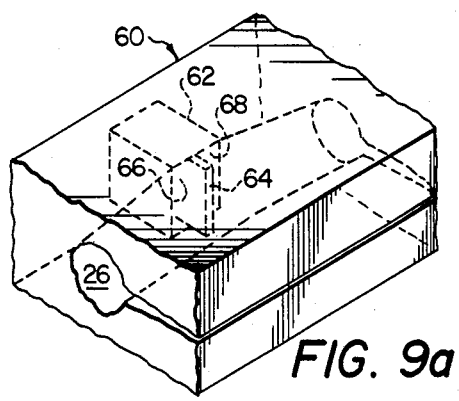
FIG. 9a is a perspective view of a rectangular entry manifold illustrating a barrier to form a co-extrusion with two materials side-by-side.

Referring now to the Drawings in detail, wherein like numerals indicate like elements throughout the several views, and in particular to FIGS. 1-3 and 5, a first embodiment of the present invention provides for forming a film 10 having side-by-side segments A and B of different thermoplastic materials, e.g., a clear thermoplastic and an opaque thermoplastic, respectfully, joined along a common edge 12. The materials A and B can be of different widths (or of the same width) and be formed of multiple layers. The degree to which the materials A and B overlap along the edge 12 can also be controlled. The film 10 is produced by use of a die such as the slot cast process extrusion die 20, having a coat hanger type manifold. The die 20 is of conventional design, except as discussed hereinafter. One example of such a die is disclosed in U.S. Pat. No. 3,398,431 issued Aug. 27, 1968, which disclosure is incorporated herein by reference.

Die 20 includes a die entry or input manifold 22 through which two separate molten feedstreams of the thermoplastic materials A and B are fed from a feed port module (not shown). The feedstreams A and B are separated by a flow barrier 24, which can be a partition disposed in the die input manifold that extends into the teardrop shaped (in cross section, see FIG. 5) area 26 of the die. The molten feed flows A and B will flow into the teardrop area 26 and flow across the entire width of the die to distribute the materials uniformly for flow into land 28 and extrusion past lips 32. The flows A and B in teardrop area 26 controllably intermix so that flows A and B flow side by side in a laminar manner in the teardrop area 28 along a portion of the width of the die toward one side of the die, with one flow in front of the other, and the side by side flow then turns approximately 90° and enters the final land to be extruded side by side from the die slot past lips 32. flow around the downstream end of the barrier 24 and the other one of the flows pushes this flow in front of it along the teardrop area as the flows move away from the barrier 24, thereby causing the width of one of the materials A and B to be greater than the width of the other in the final extrudate issuing from the die past lip 32. If the flow velocities and rates of materials A and B are approximately the same, the resultant extrudate will be formed with materials of substantially equal width. As indicated in FIG. 3, the molten flow B is at a higher velocity and flow rate than material A, so flow B will flow around and beneath the downstream end of the barrier 24 and intermix with flow A as shown in the teardrop section such that material B forms the majority of the width of the final extrudate film 10.

The two flows controlled intermix in the teardrop area 26 without the formation of a weld line and will flow over the land 28 having a common edge 12 formed by co-mingling the materials A and B. The resultant extrudate issuing from the die is a laminar film of uniform thickness comprising two different materials, e.g., opaque and clear materials A and B arranged side-by-side and co-mingled and joined along the common edge 12 therebetween. Of course, materials A and B can also be formed of multiple layers by prior conventional means, such as use of a layering feed block to provide layered material A and B into the entry manifold 22.

The entry manifold 22 of the die 20 illustrated in FIG. 3 is of the fishtail shape, such as better illustrated in FIG. 7. In the fishtail shape, the dimension of the manifold perpendicular to the plane of the film (i.e., the height) reduces toward the teardrop shaped area while the dimension in the plane of the film and perpendicular to the direction of the motion of the materials A and B (i.e., the width) increases toward the teardrop shaped area. The initial shape of the entry manifold 22 can be seen to be circular. This shape is reconfigured along the length of entry manifold 22 to form a slot opening into the teardrop shaped area. The diameter of the circular portion of the entry manifold will typically be of a dimension close to the distance between the top and bottom of the teardrop shaped area as best seen in FIGS. 5 and 9c.

It has been found that film 10 can be formed with the barrier 24 completely within the entry manifold, as illustrated in FIG. 7, or extending into the teardrop shaped area, as shown in FIG. 3, when the entry manifold has a fishtail shape. However, the barrier 24 preferably does not extend into the teardrop shaped area for fishtail shaped entry manifolds. In either situation, the degree of extension of the flow barrier 24 proximate or into the teardrop shaped area 26 of the die 20 will effect the degree of overlap or intermix of the two materials, as indicated in FIGS. 1 and 2. If little or no overlap or intermix is desired in the final film when using a barrier completely within the entry manifold, the two flows are physically separated for a longer distance within the entry manifold, as by extending the barrier closer to the interface between the entry manifold and the teardrop shaped area.

The shape of the barrier will also influence the degree of overlap or intermix of the two materials. For example, a barrier 25 having a downstream edge at an oblique angle to the flow, as shown in FIG. 9c, will create a region of overlap.

It has been observed that the material that is allowed to reach the top and bottom of the teardrop area first, normal to the direction of flow, will be the outside material in the overlap area of the final sheet. For example, in FIG. 2, the material B is shown as substantially overlapping material A along both sides of the co-mingled edge 12. If the two flows simultaneously reach a common point at the top and bottom of the teardrop area 26, there will be little or no overlap in the final sheets, as illustrated in FIG. 1. If the shape of the barrier allows one material to reach a point on the top of the teardrop shaped area while the other material reaches the point on the bottom directly below the top point, an intermix of the material will occur to create a taper at the joint. If clear and opaque materials are co-extruded side-by-side, the intermix will create a fading effect from clear to opaque, which can be a desirable appearance feature depending on the customer's preference. A barrier 25 such as shown in FIG. 9c with an oblique downstream edge will cause such an intermix.

FIG. 4 illustrates that the die input manifold 22 can be provided with a horseshoe shaped or inverted U-shaped flow barrier 24' and that a separate feed port 30 can be provided for feeding molten material B beneath the horseshoe shaped barrier, wherein it can be intermixed in teardrop area 26 with a molten feed A issuing from the die input manifold 22. In this manner, two physically separated edges 12 can be formed in the teardrop area 26 between the materials A and B and the resultant extrudate contains two separated portions of material A spaced by material B disposed therebetween.

FIG. 5 illustrates a vertical cross-sectional view of the die 20 showing that the flow barrier 24 extends between the top and bottom of the entry manifold 22 and teardrop shaped area 26 (to the extent that the barrier extends into area 26) to isolate the flow of materials A and B until the materials flow past the downstream end of the flow barrier 24. The teardrop shape of the area 26 can be clearly seen in FIG. 5. As the materials flow out of the teardrop shaped area 26 into land 28, they are reduced in thickness significantly so that the film 10 issuing from lip 32 is of a uniform predetermined thickness.

FIG. 7 illustrates an entry manifold 40 having a fishtail shape in a conventional slot cost process die 42 that incorporates a flow barrier 44 which does not extend into the teardrop shaped area. The barrier 44 defines a first passage 46 on one side thereof and a second passage 48 on the other side thereof, both of which open into the section of the entry manifold immediate the teardrop shaped area 26 and into the area 26. It can be readily seen that one extruder can provide material A to the second passage while a second extruder can provide material B to the first passage for flow into the teardrop shaped area.

FIG. 6 illustrates a perspective view of materials A and B within the die 40 as shown in FIG. 7 as they are formed by the interior passages of the die. It can be seen that the fishtail shaped entry manifold 40 preforms the materials into a film-like configuration. The teardrop shaped area 26 ensures that the material spreads across the entire width of the die and the land 28 reduces the thickness of the materials so that they issue over lips 32 at the proper film thickness.

FIG. 8 illustrates an entry manifold of fishtail shape having a curved barrier 45. Barrier 45 defines a first passage 47 on one side thereof and a second passage 49 on the other side thereof. An auxiliary port 50 is formed through the die which opens into the first passage 47. The conventional input to the die is connected with the second passage 49. As can be seen, barrier 45 does not extend to the interface between the entry manifold and the teardrop shaped area to provide more overlap and intermix of materials than if barrier 45 were extended to the interface.

FIG. 9a illustrates a section of a die 60 which has an entry manifold 62 with a square or rectangular cross section perpendicular the flow of the materials. The height of the entry manifold approximates the distance between the top and bottom of the teardrop shaped area and is uniform along its entire length. A barrier 64 extends along the length of the entry manifold 62 and again divides the mandrel into a first passage 66 and a second passage 68. The material A can be provided to first passage 66 and material B to second passage 68. It will be observed that the barrier 64 extends into the teardrop shaped area 26, although it could end prior to entry into area 26. However, it has been found that it is preferable to extend barrier 64 into the teardrop shaped area when the entry manifold has a constant height generally equal to the distance between the top and bottom of the teardrop shaped area.

Figure 9B:
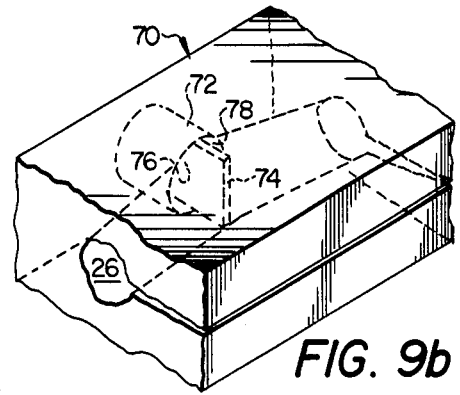
FIG. 9b is a perspective view of a round entry manifold with a barrier to form a co-extrusion of two materials side-by-side.

FIG. 9b illustrates a section of die 70 which has an entry manifold 72 of circular cross section perpendicular the direction of flow of material. The diameter of the entry manifold approximates the distance between the top and bottom of the teardrop shaped area. A barrier 74 is positioned along the length of the manifold and defines a first passage 76 on one side thereof and a second passage 78 on the other side thereof. Again, while barrier 74 can end within the entry manifold 72, it is preferable to extend the barrier 74 into the teardrop shaped area 26 of the die since the vertical height of the entry manifold approximates the distance between the top and bottom of the teardrop shaped area.

Figure 10:
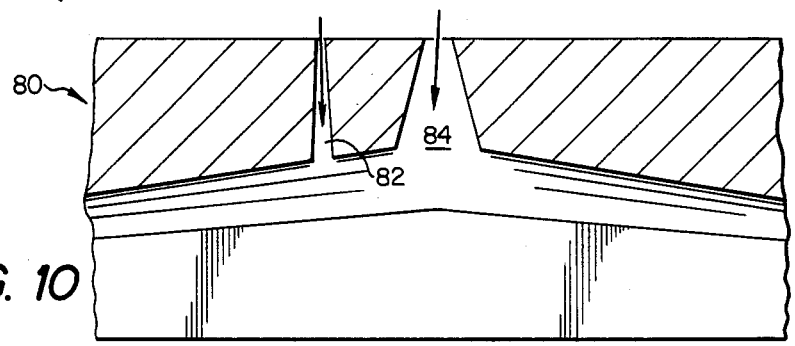
FIG. 10 is a partial horizontal cross-sectional view of a mold die where one material is provided through the entry manifold and a second material is provided through a port opening into the teardrop area to form a co-extrusion of two materials side-by-side.

FIG. 10 illustrates a conventional slot cost process die 80 that has been modified by forming a passage 82 opening into the teardrop shaped area at a distance from the entry manifold 84. Material A can be provided through the entry manifold 84 while material B can be provided through the passage 82 to form a side-by-side coextrusion.

Figure 11:
FIG. 11 is a cross-sectional view of a co-extrusion where a portion of the film is a co-extruded 3-ply and the other side is a mono-layer.

FIG. 11 illustrates a film 90 which is formed of materials A and B with dies described above but has sufficient overlap of material A to completely surround material B. As noted previously, the overlap is determined by assuring the overlapping material contact the top and bottom of the teardrop section to run out to the edges of the die. This technique can be advantageous when two distinct material compositions are desired across the width of the sheet with only one of the materials exposed. For example, this can be advantageous if the embedded material is not approved for use with food products but has other advantages which make it useful in food packaging materials. By use of such techniques, the nonapproved material is embedded within another material, which is approved for use with food products. In the alternative, the 3-ply portion of film 90 can be formed by a conventional 3-ply co-extrusion.

Figure 12:
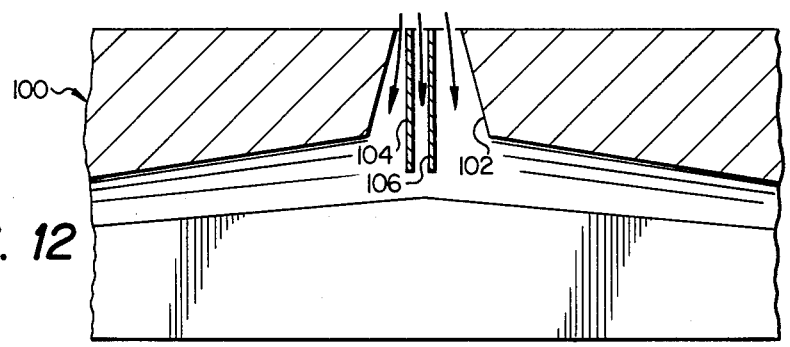
FIG. 12 is a horizontal cross-sectional view of a entry manifold of the fishtail type having two barriers designed to co-extrude three distinct materials in a side-by-side relation.
Figure 13:
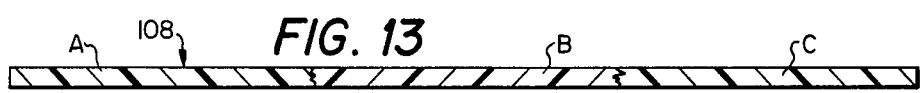
FIG. 13 is a cross-sectional view of a film extruded with the use of the entry manifold shown in FIG. 12.

FIG. 12 illustrates a die 100 which has a entry manifold 102 modified by the use of a barrier 104 and a barrier 106 across the width of the entry manifold 102. The use of two barriers defines three separate passages, and each passage can be connected to an extruder. This configuration will permit the use of three separate materials, materials A, B and C, extruded side-by-side with their common edges co-mingled. The cross section of the film 108 produced by die 100 is illustrated in FIG. 13. Clearly, any number of barriers can be provided to have three or more different materials extruded side-by-side in a film.

Figure 14:
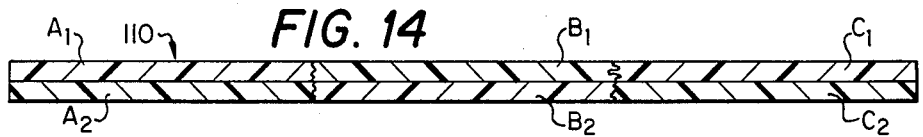
FIG. 14 illustrates a cross-sectional view of a film having multiple layers and being co-extruded with three separate materials side-by-side.

FIG. 14 illustrates a film 110 which has been formed with die 100, permitting the use of three separate flows. However, the die 100 has been used with one or more conventional feed blocks to provide at least two layers to the film. Such layering can be accomplished by techniques as disclosed in U.S. Pat. Nos. 3,479,425 issued Nov. 18, 1969 and 3,557,265 issued Jan. 19, 1971, which disclosures are herein incorporated by reference. Therefore, film 110 can actually be comprised of as many as six materials, $A_1$, $A_2$, $B_1$, $B_2$, $C_1$ and $C_2$ with certain materials side-by-side and certain materials layered. Again, by use of specific feed blocks and a sufficient number of barriers, any number of different materials can be extruded side-by-side with any number of different materials being layered therein.

The techniques of the present invention can be employed with any flowable materials, but is believed to be most useful with the thermoplastic polymers, including polyethylene and polypropylene, and particularly low density polyethylene (LDPE). It has been observed that the length of the barrier or barriers used in the die separating the flows has a relationship to the viscosity mismatch compatibility between the materials. The longer the barrier, the greater the possible viscosity mismatch, while still providing for effective co-mingling of the materials at their common edge.

When using a fishtail shaped entry manifold or other entry manifold with a height substantially less than the distance between the top and bottom of the teardrop shaped area at the interface between the entry manifold and teardrop shaped area, the barrier preferably does not extend into the teardrop shaped area. It has also been found that a sharper, more defined common edge with less co-mingling is created if the barrier extends longer within the entry manifold. A shorter barrier within the entry manifold will create more co-mingling and overlap.

When an entry manifold has a height approximately equal the distance between the top and bottom of the teardrop shaped area at the interface between the entry manifold and teardrop shaped area, the barrier preferably extends into the teardrop shaped area. The further the barrier extends into the teardrop shaped area, the greater the extent of intermix and co-mingling.

The ability to control the overlap and intermix of the co-extended material is a significant advantage. Customers can select the type of junction desired; ranging from a sharp demarcation between material to a very gradual fading of one material into the other. The joint will be very uniform along the length of the film, with no wavering or variation in the joint to detract from its appearance.

Another advantage of the present invention is the fact that the intermix of the materials is fundamentally controlled by the relative flow rates of the materials and the position and configuration of the barrier and entry manifold. Thus, adjustment of the separation distance of the die lips to adjust the thickness of the extruded film will not effect the intermix of the film materials. The present invention is preferably employed to extrude film, i.e. having a thickness of less than 10 mils, and preferably in the range of about 2 to 4 mils thick. However, it could be adapted for extruding thicker sheet materials if desired.

In the specific use for bread wrappers, the opaque material can be formed of a thermoplastic material with titanium dioxide added to the thermoplastic material to render it opaque. This opaque material forms an extremely effective background for color graphics in label printing, etc. Clearly, other colors can be formed into the opaque layer depending on particular requirements. The ability to control the degree of intermix allows the customer to select the appearance of the joint between the materials, including a sharp separation from clear to opaque or a gradual fade out from opaque to clear.

A typical production arrangement for extruding a sheet having an opaque portion and a clear portion is:

| TYPICAL COMMERICAL PRODUCTION ARRANGEMENT | | | |
| --- | --- | --- | --- |
| | Primary Extruder | A-Extruder | B-Extruder |
| Extruder Size | 6" | 4½" | 2½" |
| Material (Resin) | LDPE + Pigment | LDPE | LDPE |
| Screw Speed | 70 RPM | 70 RPM | 110 RPM |
| Stock Temperature | 500° F. | 500° F. | 510° F. |
| Head Pressure | 3000 PSI | 4000 PSI | 3500 PSI |
| Die Temperature | 450° F. | — | — |
| Haul Off Speed | 450 FPM (feet per minute) | — | — |
| Die Size | 50" | — | — |
| Gauge - Film | 2.0 Mils | — | — |
| Film Width | 40" (30" Opaque × 10" Clear) | | |
| Production Rate | 950 PPH (pounds per hour) | | |

The A extruder is used to extrude the clear portion of 10" width. The B extruder cooperates with the primary extruder to form a three layer opaque portion of 30" width with the opaque material extruded between layers of clear material to embed the pigment.

While several embodiments of the present invention have been illustrated in the accompanying Drawings and described in the foregoing Detailed Description, it will understood that the invention is not limited to the embodiments disclosed, but is capable of numerous rearrangements, modifications and substitutions of parts and elements without departing from the spirit of the invention.

I claim:

1. An apparatus for forming a co-extruded film in a die, the die having an entry manifold opening into a distribution manifold, the distribution manifold for distributing material along the width of the die for extrusion through a die extrusion slot, comprising:

at least one barrier positioned in the entry manifold, said barrier extending parallel to the direction of extrusion of the material and perpendicular to the width of the die, to define first and second mutually isolated passages through at least a portion of the entry manifold;

first means to provide a flowable first material to the first passage for flow through the die at a first predetermined rate;

second means to provide a flowable second material to the second passage for flow through the die at a second predetermined rate; and said first and second means controlling the predetermined rates of said materials with the first and second materials flowing side by side along a portion of the width of the die in the distribution manifold and extruding the first and second materials from the die slot side by side in a film of uniform thickness, the first and second materials joining along their common edge to form the film, said first and second means further for determining the location of the common edge by the relative rates of flow of said first and second predetermined rates.

2. The apparatus of claim 1 having multiple barriers to define at least three mutually isolated passages through at least a portion of the entry manifold, means being provided for flowing materials through each of the passages to extrude the materials side-by-side in a film of uniform thickness, with the materials co-mingling and joining along adjacent edges to form the film.

3. The apparatus of claim 1 further comprising means for providing multi-layered material to the first and second passages to form a multi-layered film.

4. The apparatus of claim 1 wherein the distribution manifold is teardrop shaped in cross-section taken parallel to the direction of extrusion of the materials and perpendicular to the width of the die into which flows the materials from the entry manifold, the teardrop shape having a top and bottom, the entry manifold opening into the teardrop shape with a height dimension generally equal to the distance between the top and bottom of the teardrop shape, the barrier extending into the teardrop shape.

5. The apparatus of claim 4 wherein the further the barrier extends into the teardrop shape, the greater the intermix between the materials.

6. The apparatus of claim 1 wherein the distribution manifold is teardrop shaped in cross-section taken parallel to the direction of the extrusion of the materials and perpendicular to the width of the die into which the materials flow from the entry manifold, the teardrop shape having a top and a bottom, then entry manifold opening into the teardrop shape with a height less than the distance between the top and bottom of the teardrop shape, the barrier ending prior to the teardrop shape.

7. The apparatus of claim 6 wherein the closer the barrier extends to the interface of the entry manifold and teardrop shape, the less the intermix between the materials.

8. The apparatus of claim 1 wherein the entry manifold has a fishtail shape.

9. The apparatus of claim 4 wherein the entry manifold has a rectangular cross section perpendicular the direction of flow of the materials.

10. The apparatus of claim 4 wherein the entry manifold has a circular cross section perpendicular the direction of flow of the materials.

11. The apparatus of claim 6 wherein the entry manifold has a fishtail shape.

12. An apparatus for forming a co-extruded film in a slot cast process die, the die having an entry manifold opening into a distribution manifold extending across the width of the die, the distribution manifold distributing material to an extrusion slot, comprising:

at least one fixed barrier positioned in the entry manifold, said barrier extending parallel to the direction of extrusion of the material and perpendicular to the width of the die, to define first and second mutually isolated passages through at least a portion of the entry manifold;

first means to provide a flowable first material to the first passage for flow through the die at a predetermined rate;

second means to provide a flowable second material to the second passage for flow through the die at a predetermined rate;

the distribution manifold having a teardrop shape in cross section taken parallel to the direction of extrusion of the materials and perpendicular the width of the die into which flows the materials from the entry manifold, the teardrop shape having a top and bottom, the entry manifold opening into the teardrop shape with a height dimension generally equal to the distance between the top and bottom of the teardrop shape, the barrier extending into the teardrop shape, the teardrop shape decreasing in cross section on either side of the entry manifold to maintain constant pressure in the materials being extruded; and said first and second means controlling the predetermined rates for side by side flow along a portion of the width of the die and flow of the materials, the first and second materials joining along their common edge within the teardrop shape, and extruding the first and second materials through the slot and side by side in a film of uniform thickness, the position of the common edge being determined by the relative flow rates of the materials.

13. A film die for extruding plural materials as a film and combining said materials edge to edge across the width of said film comprising:

a die block having facing surfaces defining a slot passage terminating in a slot opening through an exterior surface of said die of height corresponding to the final thickness of the film and extending along the width of said die block;

said slot passage communicating with an elongated distribution passage extending generally along the width of said die block and in communication with said slot passage;

said die block defining plural inlet passages extending between an exterior surface of said block and said elongated distribution passage, said elongated distribution passage having a dimension parallel the height of the slot opening that is greater than the separation of the facing surfaces of said slot passage in a direction approximately perpendicular to said facing surfaces such as to permit said elongated distribution passage to distribute said materials to the entrance of the slot passage across the entire width of said slot passage corresponding to the width of the extruded sheet;

said slot passage and said elongated distribution passages together having a coat hanger shaped configuration when viewed in a direction generally perpendicular to said facing surfaces and in the direction of extrusion of the film from the slot opening, said inlet passage being separated by a fixed partition extending substantially into, but only partially across, said elongated distribution passage said partition extending parallel to the direction of extrusion of the material and perpendicular to the width of the die;

a first material flowing into the elongated distribution passage through the inlet passage on one side of the partition, a second material flowing into the elongated distribution passage through the inlet passage on the other side of said partition to produce an extruded film with the first and second materials joined along a common edge.

* * * * *